(12) United States Patent
Hansson et al.

(10) Patent No.: US 10,186,868 B2
(45) Date of Patent: Jan. 22, 2019

(54) POWER SUPPLY APPARATUS WITH CONTROLLABLE MULTIPLE INPUT RECTIFICATION

(71) Applicant: Flexenclosure AB (Publ), Vara (SE)

(72) Inventors: Anders Hansson, Stockholm (SE); Jonas Hallström, Torslanda (SE)

(73) Assignee: FLEXENCLOSURE AB (PUBL), Vara (SE)

( * ) Notice: Subject to any disclaimer, the term of this patent is extended or adjusted under 35 U.S.C. 154(b) by 251 days.

(21) Appl. No.: 14/778,652

(22) PCT Filed: Mar. 27, 2013

(86) PCT No.: PCT/SE2013/050349
§ 371 (c)(1),
(2) Date: Sep. 21, 2015

(87) PCT Pub. No.: WO2014/158065
PCT Pub. Date: Oct. 2, 2014

(65) Prior Publication Data
US 2016/0056632 A1 Feb. 25, 2016

(51) Int. Cl.
*H02J 1/10* (2006.01)
*H02J 3/38* (2006.01)
(Continued)

(52) U.S. Cl.
CPC .............. *H02J 3/381* (2013.01); *H02J 9/062* (2013.01); *H02M 7/1623* (2013.01);
(Continued)

(58) Field of Classification Search
CPC ............ H01L 2224/45015; H01L 2924/00014; H02M 7/217; Y02B 70/126; H02J 9/062
See application file for complete search history.

(56) References Cited

U.S. PATENT DOCUMENTS

| 4,088,933 | A | 5/1978 | Hashimoto |
| 4,682,094 | A | 7/1987 | Kuroiwa |

(Continued)

FOREIGN PATENT DOCUMENTS

| FR | 2317803 | 2/1977 |
| GB | 1395917 | 5/1972 |

(Continued)

OTHER PUBLICATIONS

Konstantin Kanelis; Extended European Search Report, counterpart international application No. PCT/SE2013050349, dated Jan. 3, 2017, European Patent Office, Munich, DE.
(Continued)

*Primary Examiner* — Sibin Chen
(74) *Attorney, Agent, or Firm* — Babcock IP, PLLC

(57) ABSTRACT

A power supply apparatus for providing electrical power to a power consuming device or a power conversion device from at least one of a first AC power source and a second AC power source. The power supply apparatus comprises controllable rectifier devices associated with each of the first and second AC power sources. The controllable rectifier devices are controllable to simultaneously rectify and control the power provided by the first and second AC power sources.

12 Claims, 4 Drawing Sheets

(51) Int. Cl.
*H02M 7/162* (2006.01)
*H02J 9/06* (2006.01)
*H02P 7/295* (2016.01)
*H02P 7/293* (2016.01)
*H02M 7/17* (2006.01)
*H02M 1/00* (2006.01)
*H02M 7/08* (2006.01)

(52) U.S. Cl.
CPC .............. H02P 7/293 (2016.02); H02P 7/295 (2013.01); *H02M 7/08* (2013.01); *H02M 7/1626* (2013.01); *H02M 7/17* (2013.01); *H02M 2001/0083* (2013.01)

(56) References Cited

U.S. PATENT DOCUMENTS

| | | | |
|---|---|---|---|
| 6,542,023 B1 * | 4/2003 | Daun-Lindberg ... | H03K 17/735 307/85 |
| 7,265,458 B2 | 9/2007 | Edelen et al. | |
| 2004/0233590 A1 * | 11/2004 | Nakagawa ............ | H02M 5/458 361/18 |
| 2005/0269974 A1 * | 12/2005 | Ravindra ............... | H05B 41/28 315/308 |
| 2007/0279947 A1 | 12/2007 | Brandt | |
| 2010/0264743 A1 * | 10/2010 | Jung ....................... | H02J 9/061 307/80 |
| 2014/0009202 A1 * | 1/2014 | Nagai ..................... | H02M 1/08 327/374 |

FOREIGN PATENT DOCUMENTS

| | | |
|---|---|---|
| GB | 1401488 | 7/1975 |
| JP | S59153474 | 9/1984 |
| JP | 60106366 | 6/1985 |
| JP | H08275532 | 10/1996 |

OTHER PUBLICATIONS

Sara Thulin, International Search Report for associated case PCT/SE2013/050349, dated Jan. 29, 2014, Stockholm Sweden.
Konstantin Kanelis; EPO Office Action, counterpart EPO application No. 13880085.9-1201, dated Nov. 27, 2018, European Patent Office, Munich, DE.

* cited by examiner

POWER SUPPLY APPARATUS WITH CONTROLLABLE MULTIPLE INPUT RECTIFICATION

TECHNICAL FIELD OF THE INVENTION

The present invention relates to a power supply apparatus for providing electrical power from at least one of a first AC power source and a second AC power source.

TECHNICAL BACKGROUND

In cases when a very reliable supply of electrical power is needed and/or when available electrical power sources are unreliable, it may be necessary to be able to switch between different AC power sources to prevent or at least reduce loss of the supply of electrical power to a power consumer.

To provide such a switch between different AC power sources, it is known to use electromechanical transfer switches which connect or disconnect AC power sources by physically closing or opening electrical circuits.

Such conventional electromechanical transfer switches have various drawbacks. For example, if a first AC power source fails, there may be a period of interruption of supply of electrical power until a second AC power source is connected. Furthermore, the electromechanical switching may lead to latching and high current transients.

U.S. Pat. No. 5,138,184 discloses a so-called static transfer switching apparatus for switching between AC power sources. This type of apparatus can switch faster than the above-mentioned conventional electromechanical transfer switches.

The static transfer switching apparatus according to U.S. Pat. No. 5,138,184 may be well suited for feeding AC loads. When it is desired to feed DC loads, such as batteries etc, the output from the static transfer switching apparatus needs to be rectified using additional circuitry, such as full wave rectifier bridges. This results in power losses and thermal stress, which may be particularly detrimental in renewable energy applications with high efficiency requirements or in applications where high ambient operating temperatures and limited cooling possibilities is a significant concern.

SUMMARY

In view of the above-mentioned and other drawbacks of the prior art, a general object of the present invention is thus to provide a more energy efficient way of enabling switching between first and second AC power sources, in particular for feeding a DC load.

According to the present invention, it is therefore provided a power supply apparatus for providing electrical power to a power consuming device or a power conversion device from at least one of a first AC power source and a second AC power source, the power supply apparatus comprising: first and second input terminals for connection of the first AC power source between the first and second input terminals; third and fourth input terminals for connection of the second AC power source between the third and fourth input terminals; first and second output terminals for connection of the power consuming device or the power conversion device between the first and second output terminals; a plurality of rectifier devices comprising: at least one rectifier device electrically connecting each of the input terminals and the first output terminal in such a way that current is prevented from flowing from the first output terminal to each of the input terminals; and at least one rectifier device electrically connecting each of the input terminals and the second output terminal in such a way that current is prevented from flowing from the input terminals to the second output terminal, wherein each of: a first rectifier device, of the plurality of rectifier devices, electrically connecting the first input terminal and the first output terminal; a second rectifier device, of the plurality of rectifier devices, electrically connecting the first input terminal and the second output terminal; a third rectifier device, of the plurality of rectifier devices, electrically connecting the fourth input terminal and the first output terminal; a fourth rectifier device, of the plurality of rectifier devices, electrically connecting the fourth input terminal and the second output terminal, is a controllable rectifier device being controllable to allow or prevent flow of current through the controllable rectifier device.

By "AC power source" should be understood any source of alternating current (AC) electrical power. In particular, either of both of the first and second AC power sources may, for example, be a single phase AC power source or one phase from a three-phase AC power source. Examples of AC power source, for instance, include a power grid, a combustion engine driven generator, a wind turbine, etc.

The "power consuming device", or simply "load", may be any load that consumes electrical power as alternating current (AC) or direct current (DC).

A rectifier device is a device that, at least in its normal operating regime, conducts current in one direction only. Various diodes are examples of rectifier devices.

Rectifier devices electrically connecting the second and third input terminals with the first and second output terminals, respectively, may advantageously be rectifier devices that are not controllable, such as diodes. In a preferred embodiment, the second and third input terminals may advantageously be a common input terminal.

The present invention is based on the realization that controllable rectifier devices, if suitably arranged, can be used to perform the dual function of rectification of the output of an AC power source and switching between a first and a second AC power source. This provides a more energy-efficient power supply apparatus, in particular for feeding a DC load.

Moreover, improved switching between AC power sources can be provided with a simpler and less costly solution than in the prior art. The switching can be carried out without moving parts and using only unidirectional switching elements.

Furthermore, the switching between the first and the second AC power source can be made complete or partial. Partial switching (a part of the total electrical power from the first AC power source and a part of the total electrical power from the second AC power source) allows for use of a preferred first AC power source as far as possible and "topping up" with the second AC power source. For instance, the first AC power source may be a source of renewable energy, such as a wind turbine.

In addition, various embodiments of the power supply apparatus according to the present invention provide for gradual ("soft") switching between the AC power sources, which may considerably reduce the strain on circuitry downstream of the AC power sources and/or on the load.

According to various embodiments of the present invention, the power supply apparatus may further comprise a controller connected to each of the controllable rectifier devices for controlling flow of current through the controllable rectifier devices. Through this controller, the power supply apparatus may independently control the flow of current from the first and second AC power sources, respectively, based on stored conditions and/or sensed properties of the first and/or second AC power sources.

The controller may be provided in the form of hardware, software or a combination thereof, and configuration of the controller may be achieved through hardware in the controller, through a computer program adapted to run on a microprocessor comprised in the controller, or as a combination thereof.

According to one embodiment, the controller may be configured to: control the first rectifier device and the second rectifier device to allow flow of current through at least one of the first rectifier device and the second rectifier device only during a portion of each half period for the first AC power source; and/or control the third rectifier device and the fourth rectifier device to allow flow of current through at least one of the third rectifier device and the fourth rectifier device only during a portion of each half period for the second AC power source.

The portion of each half period of the first and/or second AC power sources may be a variable portion ranging from 0% to 100% of the half period. This type of control is often referred to as conduction angle control and is a convenient way of gradually increasing/decreasing current drawn from the first and/or second AC power source.

This is particularly useful during starting or ending supply of current from the first and/or second AC power source to achieve "ramp up" or "ramp down". After "ramp up" of a particular AC power source, the controllable rectifier devices associated with that AC power source may be controlled to always be "on" (allow flow of current).

In various embodiments, portion of each half period may be at the end of the each half period, so that a particular portion always ends at the same phase position. Controlling the portion then involves controlling the "start time" in relation to the end of a particular half period.

This control scheme is particularly useful for controllable rectifier devices which can be controlled from a non-conducting state to a conducting state, but not back to a non-conducting state. An example of such a controllable rectifier device is a thyristor.

Moreover, the controller comprised in the power supply apparatus may be configured to: control the first rectifier device to allow flow of current through the first rectifier device only during a portion of each positive half period for the first AC power source, and the second rectifier device to allow flow of current through the second rectifier device only during a portion of each negative half period for the first AC power source; and/or control the third rectifier device to allow flow of current through the third rectifier device only during a portion of each positive half period for the second AC power source, and the fourth rectifier device to allow flow of current through the fourth rectifier device only during a portion of each negative half period for the second AC power source.

The alternating control of the controllable rectifier devices in the power supply apparatus according to these embodiments allows for smooth ramp up or ramp down since the flow of current can be controlled during both the positive and negative half periods.

It should be noted that the various embodiments mentioned above do not rely on active measurement of input current drawn from the first and/or second AC power source(s) and can therefore be implemented with very few physical components, hence at very low cost According to embodiments, the controller may further comprise first sensing circuitry arranged to sense at least one of a first voltage, a first frequency, and a first current provided by the first AC power source; and second sensing circuitry arranged to sense at least one of a second voltage, a second frequency, and a second current provided by the second AC power source.

In such embodiments, the controller may advantageously be configured to control the first rectifier device and the second rectifier device based on the first voltage; and control the third rectifier device and the fourth rectifier device based on the second voltage.

For instance, the above-mentioned control of the timing of when to allow flow of current through the different rectifier devices may advantageously be based on a sensed property, that is, voltage, frequency or current.

According to another embodiment of the present invention, the power supply apparatus may further comprise a Bridge Control block connected with control signals and reference values to and from a Master Controller.

For example, if a gradual or sudden reduction in the output voltage of an AC power source is sensed, the controller may automatically provide a suitable conduction phase angle adjustment to the controllable rectifier devices to reduce or entirely cut incoming current from that AC power source.

The aforementioned control feature is thus advantageous in preventing excess strain on any of the incoming AC sources and thereby avoiding complete disruption of power to the load of the power supply apparatus due to AC source collapse.

Such a power collapse may result from a generator loosing speed and stalling, or because a small and under-dimensioned rural AC power substation suddenly cuts power due to the load connected to the power supply apparatus exceeding permitted limits.

To provide for improved precision in the above-mentioned conduction angle control and/or to enable the power supply apparatus to handle cases in which the frequency of the first and/or second AC power source(s) is unknown, the controller may be configured to determine a measure indicative of a period for the first AC power source based on the first voltage; and determine a measure indicative of a period for the second AC power source based on the second voltage.

According to various embodiments, the controller may be configured to control the first rectifier device and the second rectifier device to decrease a time during which flow of current through each of the first rectifier device and the second rectifier device is allowed in response to reduction of at least one of the first voltage and the first frequency; and/or control the third rectifier device and the fourth rectifier device to decrease a time during which flow of current through each of the third rectifier device and the fourth rectifier device is allowed in response to reduction of at least one of the second voltage and the second frequency.

According to further embodiments, the controller may be configured to compare the first current with a first reference current; and control, if the first current is larger than the first reference current, the first rectifier device and the second rectifier device to decrease a time during which flow of current through each of the first rectifier device and the second rectifier device is allowed; and/or compare the second current with a second reference current; and control, if the second current is larger than the second reference current, the third rectifier device and the fourth rectifier device to decrease a time during which flow of current through each of the third rectifier device and the fourth rectifier device is allowed.

Moreover, the power supply apparatus may further comprise a power conversion device connected between the first and second output terminals, the power conversion device being configured to shape an output current between the first and second output terminals to follow an output voltage between the first and second output terminals.

The conduction angle control schemes given in aforementioned embodiments are not the sole means of controlling the magnitude of drawn current from the input AC sources and the effective amount of power drawn by the complete Power Supply Apparatus.

Alternatively, in yet another embodiment, analog or digital control systems embedded in the Power Conversion Unit or Master Controller blocks may also be devised to reduce the net amount of power drawn from the AC power sources by means controlling of shifting the Power Conversion Unit operating point or operating condition and power transfer to the load, while keeping all or some of the controllable rectifier devices at a fixed conduction state without active conduction angle control or intervention from the Bridge Control unit.

Advantageously, the controller may be connected to at least one of the controllable rectifier devices via at least one electrically non-conducting driver.

Through the electrically non-conducting drivers, the same control can conveniently be provided to controllable rectifier devices that are at different voltage levels. The electrically non-conducting driver may advantageously be selected from the group consisting of an isolated gate drive circuit, an optical coupler.

In embodiments of the power supply apparatus according to the present invention, the second input terminal and said third input terminal may, furthermore, be provided as a common input terminal. In these embodiments, fewer components are required and a more compact solution can be achieved. When the second input terminal and the third input terminal are provided as a common input terminal, the neutral line of each of the first and second AC power sources should be connected to the common input terminal.

The power supply apparatus according to various embodiments of the present invention may, furthermore, be included in a power supply system further comprising a first AC power source connected between the first and second input terminals of the power supply apparatus; and a second AC power source connected between the third and fourth input terminals of the power supply apparatus.

In various embodiments, the first AC power source may be a single phase source with neutral connected to the second input terminal; and the second AC power source may be a single phase source with neutral connected to the third input terminal, wherein the second and third input terminals are electrically connected to each other.

According to a second aspect of the present invention, there is provided a method of switching supply of DC power to a power consumer from a first AC power source to a second AC power source, the method comprising the steps of: increasing a time during which power from the second AC power source is rectified through conduction angle control of at least one controllable rectifier device associated with the second AC power source; and reducing a time during which power from the first AC power source is rectified through conduction angle control of at least one controllable rectifier device associated with the first AC power source.

By increasing the time or rather fraction of the total time during which power from the second AC power source is rectified before reducing the time (fraction of the total time) during which power from the first AC power source is rectified, continuous supply of power to the power consuming device is provided for. Furthermore, this procedure increases the safety of the switch-over, since the first AC power source will provide practically no current once the second AC power source has been connected.

According to various embodiments, the time during which power from the second AC power source is rectified through conduction angle control may be gradually increased. Hereby, a "soft start" of the second AC power source can be achieved, whereby the startup current from the second AC power source can be limited in order to protect downstream circuitry, such as a power conversion unit. For instance, the power from the second AC power source may be gradually increased from zero or close to zero to the desired/required power over at least a time corresponding to a period for the second AC power source.

The time during which power from the first AC power source is rectified may be abruptly reduced to reduce switching stress. For instance, the power from the first AC power source may be brought to zero or close to zero in a matter of microseconds, such as in less than 1 millisecond.

In summary, the present invention relates to a power supply apparatus for providing electrical power to a power consuming device or a power conversion device from at least one of a first AC power source and a second AC power source. The power supply apparatus comprises controllable rectifier devices associated with each of the first and second AC power sources. The controllable rectifier devices are controllable to simultaneously rectify and control the power provided by the first and second AC power sources.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF AN EXAMPLE EMBODIMENT

In the present detailed description, various embodiments of the power supply apparatus and method according to the present invention are mainly discussed with reference to a power supply system comprising two single phase AC power sources and supplying electrical power to a DC power consumer.

It should be noted that this by no means limits the scope of the present invention, which equally well includes, for example, a power supply system comprising additional single phase AC power sources as well as three phase AC power sources. The power supply system may, moreover, be designed for supplying power to an AC power consumer.

Figure 1:
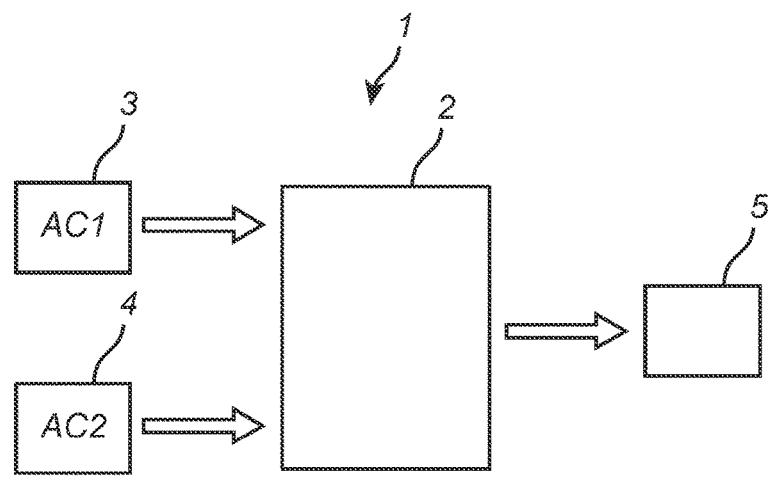
FIG. 1 schematically illustrates an application for a power supply system according to an example embodiment of the present invention.

FIG. 1 schematically illustrates an application for a power supply system according to an example embodiment of the present invention. The power supply system 1 comprises a power supply apparatus 2, a first AC power source 3 and a second AC power source 4, and supplies electrical power to a power consuming device 5.

The power consuming device 5 may, for example, be telecom equipment. It should, however, be noted that the power supply system may be used for providing electrical power to practically any power consumer.

An embodiment of the power supply apparatus 2 comprised in the power supply system in FIG. 1 will now be described in more detail with reference to FIG. 2.

Figure 2:
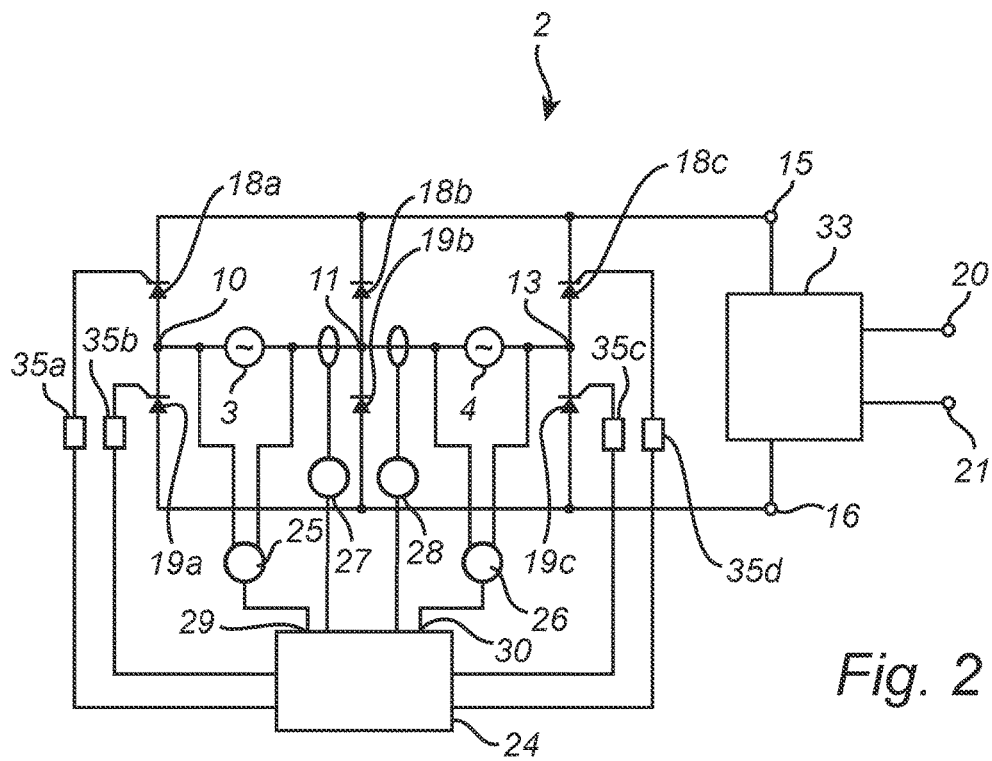
FIG. 2 is a block diagram schematically illustrating the power supply apparatus comprised in the power supply system in FIG. 2.

Referring to FIG. 2, the power supply apparatus 2 comprises first 10 and second 11 input terminals for connection of the first AC power source 3, third 11 and fourth 13 input terminals for connection of the second AC power source 4, and first 15 and second 16 output terminals for connection of the power conversion unit 33, which in turn has output terminals 20 and 21 for supplying the power consuming device 5, as is illustrated in FIG. 2. In the preferred embodiment shown in FIG. 2, the second and third input terminals are provided as a common input terminal or node 11. This requires that the neutral line of the first AC power source 3 and the neutral line of the second AC power source 4 are both connected to the common input terminal 11.

As is shown in FIG. 2, the power supply apparatus 2 further comprises a first set of rectifier devices 18a-c and a second set of rectifier devices 19a-c.

The first set of rectifier devices comprises a first rectifier device 18a arranged between the first input terminal 10 and the first output terminal 15, a second rectifier device 18b arranged between the common input terminal 11 and the first output terminal 15, and a third rectifier device 18c arranged between the fourth output terminal 13 and the first output terminal 15. Each of the rectifier devices 18a-c of the first set of rectifier devices is, as is indicated in FIG. 2, arranged in such a way that current is prevented from flowing through the rectifying devices 18a-c towards the respective input terminals 10 to 13, at least under normal operating conditions.

Analogously, the second set of rectifier devices comprises a first rectifier device 19a arranged between the first input terminal 10 and the second output terminal 16, a second rectifier device 19b arranged between the common input terminal 11 and the second output terminal 16, and a third rectifier device 19c arranged between the fourth output terminal 13 and the second output terminal 16. Each of the rectifier devices 19a-c of the second set of rectifier devices is, as is indicated in FIG. 2, arranged in such a way that current is prevented from flowing through the rectifying devices 19a-c from the respective input terminals 10 to 13, at least under normal operating conditions.

As is indicated in FIG. 2 using the thyristor symbol, the first 18a and third 18c rectifier devices of the first set of rectifier devices, and the first 19a and third 19c rectifier devices of the second set of rectifier devices are controllable rectifiers.

In this context it should be noted that the thyristor (sometimes also referred to as a silicon controlled rectifier (SCR)) is only one example of a suitable controllable rectifier device. Other examples include a triac, and a thyratron etc.

As shown in FIG. 2, the power supply apparatus additionally comprises a controller for controlling operation of the power supply apparatus 2. In the example embodiment of FIG. 2, the controller comprises a control unit 24, first 25 and second 26 voltage sensors, and first 27 and second 28 current sensors. As is schematically illustrated in FIG. 2, the controller further comprises galvanically isolated drivers 35a-d.

The first voltage sensor 25 is arranged to sense the voltage between the first 10 and second 11 input terminals (across the first AC power source 3), and the second voltage sensor 26 is arranged to sense the voltage between the third 12 and fourth 13 input terminals (across the second AC power source 4). Signals indicative of the sensed voltages are provided from the first 25 and second 26 voltage sensors to the control unit 24.

The first current sensor 27 is arranged to sense the current provided by the first AC power source 3 and the second current sensor 28 is arranged to sense the current provided by the second AC power source 4. Signals indicative of the sensed currents are provided from the first 27 and second 28 current sensors to the control unit 24.

Based on the signals from the first 25 and second 26 voltage sensors and/or the first 27 and second 28 current sensors, the control unit 24 determines control parameters for the controllable rectifiers 18a, 19a, 18c and 19c. To control the controllable rectifiers 18a, 19a, 18c and 19c in accordance with the determined control parameters, the control unit 24 provides control signals to the controllable rectifying devices 18a,c and 19a,c via the galvanically isolated drivers 35a-d.

Even though not specifically indicated in FIG. 2, the control unit may additionally receive further input, such as an input signal indicative of the instantaneous electrical power required by the power consuming device 5. In such embodiments, the control parameters for the controllable rectifiers 18a, 19a, 18c and 19c may additionally or alternatively be determined based on such further input.

Although not shown in FIG. 1 or FIG. 2, the power supply system 1 may further comprise at least one DC power source, such as a battery.

Figure 3:
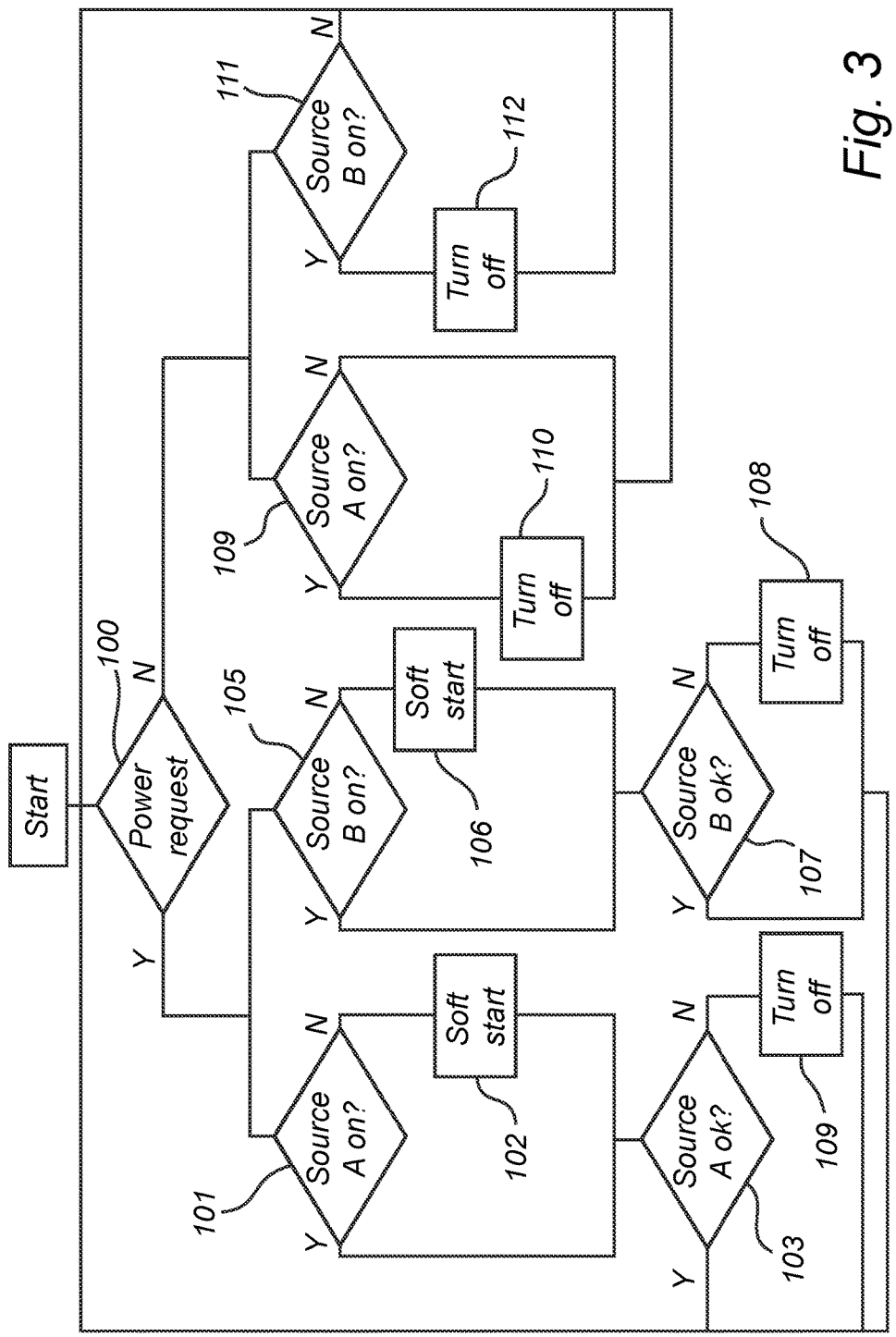
FIG. 3 is a flow-chart schematically illustrating an example of a method according to an embodiment of the present invention.

An exemplary method according to embodiments of the present invention will now be described with reference to the flow-chart in FIG. 3.

In a first step 100, it is determined if power conversion is requested. Such a request may, for example, be provided as long as the power consuming device 5 in FIG. 1 is activated.

If it is determined that power conversion is requested, the method proceeds to determine if the first AC power source 3 is presently controlled to provide power in step 101.

If it is determined in step 101 that the first AC power source 3 is not controlled to provide power (is 'off') then the method proceeds to step 102 and ramps up the conduction angle for the first AC power source 3 from 0% to 100% over a period of at least one AC mains period. Thereafter, in step 103, it is determined if the first AC power source 3 is 'OK'.

If it is instead determined in step 101 that the first AC power source 3 is presently controlled to provide power (is 'on'), then the method directly proceeds to step 103 and determines if the first AC power source 3 is 'OK'.

The determination in step 103 of whether or not the first AC power source 3 is 'OK' may, for example, involve sensing at least one of a voltage, a frequency and a current of the first AC power source 3 and to compare the sensed parameter(s) with one or several corresponding threshold values or ranges.

If it is determined in step 103 that the first AC power source 3 is not 'OK', then the method proceeds to step 104 to 'turn off' the first AC power source 3 by rapidly decreasing the conduction angle for the first AC power source from 100% to 0%. For instance, the conduction angle may be decreased from 100% to 0% in a matter of microseconds. Thereafter, the method returns to step 100 to check if power conversion is presently requested.

If it is instead determined in step 103 that the first AC power source is 'OK', then the method directly returns to step 100 to check if power conversion is presently requested.

Regarding the second AC power source 4, steps 105 to 108, corresponding to the above described steps 101 to 104, respectively, are carried out.

If the determination in step 100 is that power conversion is presently not requested (whether or not power conversion has previously been requested), then the method proceeds to step 109 to determine if the first AC power source 3 is presently controlled to provide power. If it is determined in step 109 that the first AC power source 3 is presently controlled to provide power (is 'on'), then the method proceeds to step 110 where the first AC power source is turned off as was described above in connection with the description of step 104. Thereafter, the method returns to step 100 to check if power conversion is presently requested.

If it is instead determined in step 109 that the first AC power source is 'off', then the method directly returns to step 100 to check if power conversion is presently requested.

Regarding the second AC power source 4, steps 111 and 112, corresponding to the above described steps 109 and 110, respectively, are carried out.

An exemplary control sequence that may result from controlling the power supply apparatus in FIG. 2 using the method in FIG. 3 will now be described with reference to the timing diagram in FIG. 4.

Figure 4:
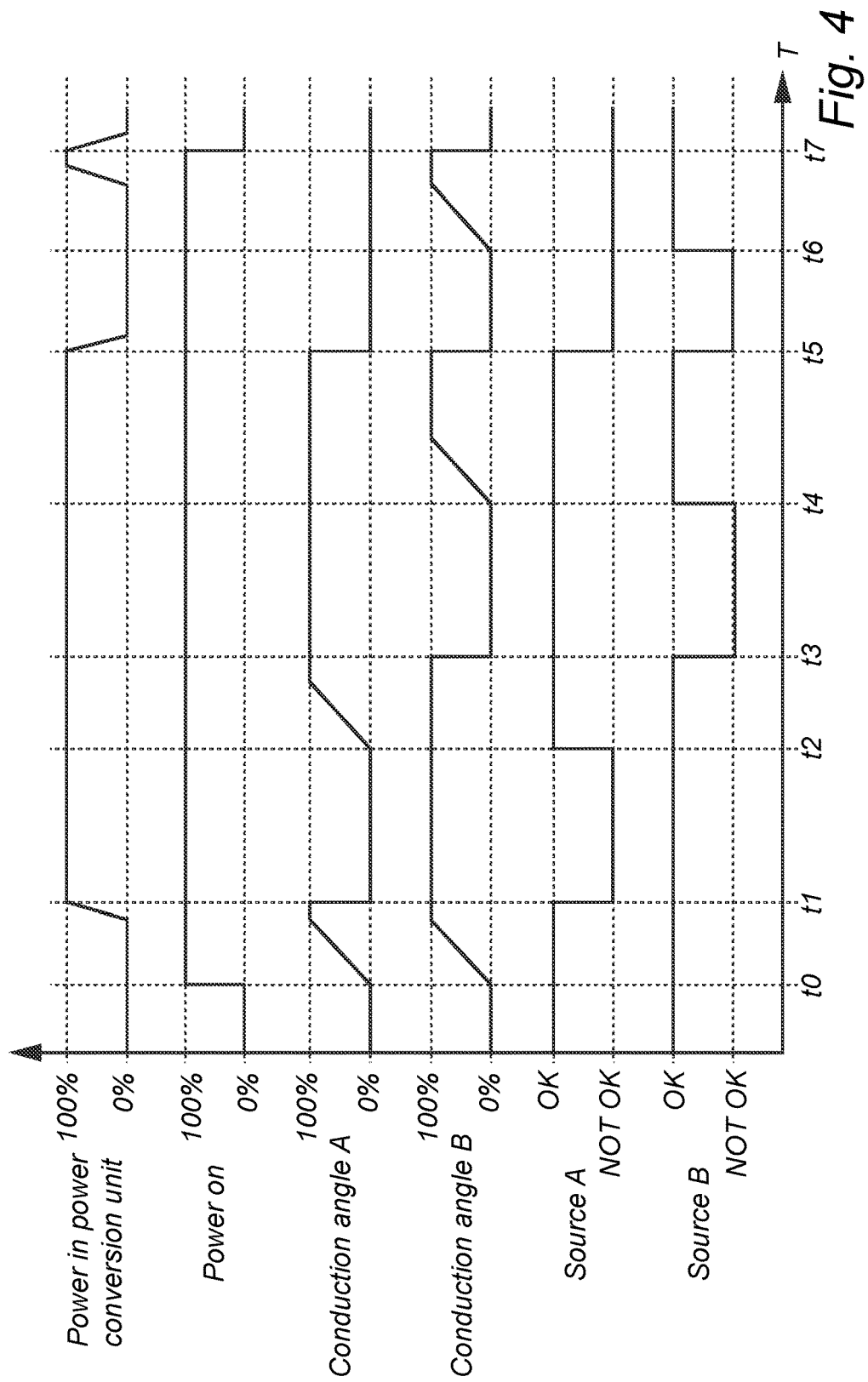
FIG. 4 is a timing diagram schematically illustrating an exemplary control sequence.

The timing diagram in FIG. 4 includes from top to bottom graphs illustrating the power in the power conversion unit 33 (the total power through the power conversion unit 33), the power conversion request status, the conduction angle control of the first AC power source 3, the conduction angle control of the second AC power source 4, the status of the first power source 3 ('OK' or 'NOT OK'), and the status of the second power source 4 ('OK' or 'NOT OK').

At the time $t_0$, a command to start power conversion is received. Since both the first AC power source 3 and the second AC power source 4 are 'off' and 'OK', the power supply apparatus 4 is controlled to 'soft start' the first AC power source 3 and the second AC power source 4.

This 'soft start' according to embodiments of the present invention will now be described with reference to FIG. 2 and to the timing diagrams in FIGS. 5a-b.

Figure 5A:
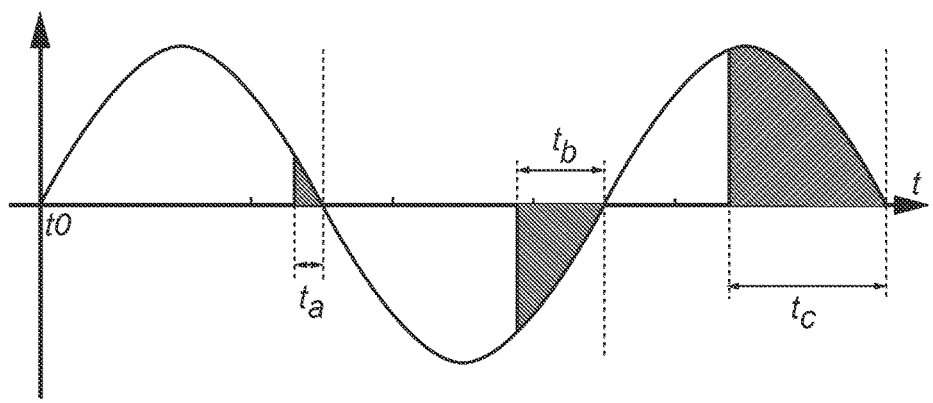
FIGS. 5a-b are timing diagrams schematically illustrating conduction angle control for the "soft start" functionality used in FIG. 4.
Figure 5B:
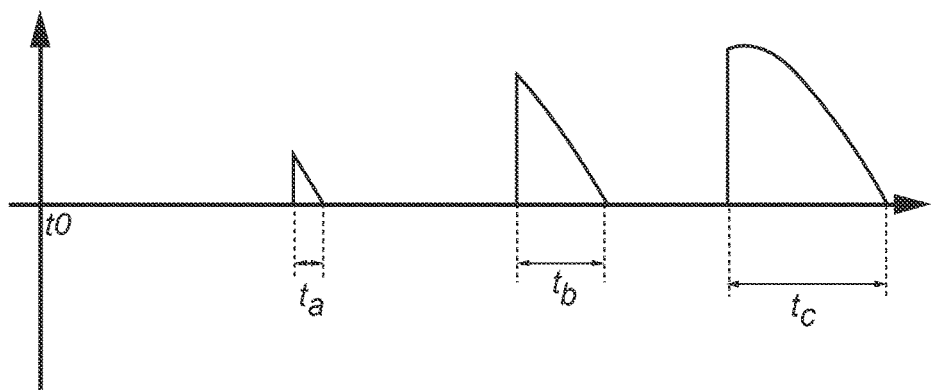

FIG. 5a illustrates the voltage across the first AC power source 3 as a function of time, and FIG. 5b illustrates the voltage provided from the first AC power source 3 to the power conversion unit 33 as a function of time during a part of a 'soft start' sequence using conduction angle control.

At the end of the first half period, controllable rectifier device 18a, referring to FIG. 2, is controlled to allow passage of current during the time period $t_a$ indicated in FIGS. 5a-b. At the end of the second half period, controllable rectifier device 19a is controlled to allow passage of current during the time period $t_b$ indicated in FIGS. 5a-b. At the end of the third half period, controllable rectifier device 18a is again controlled to allow passage of current during the time period $t_c$ indicated in FIGS. 5a-b. Since $t_c > t_b > t_a$, the power provided by the first AC power source 3 to the power conversion unit 33 is gradually increased—the first AC power source 3 is 'soft started' or 'ramped up'.

Returning now to FIG. 4, both the first AC power source 3 and the second AC power source 4 are soft started as described above starting from the time $t_0$. This means that power is provided to the power conversion unit 33 as is schematically indicated in the top graph in FIG. 4.

At the time $t_1$, it is determined that the first AC power source 3 is 'NOT OK'. As a result of this determination, controllable rectifier devices 18a and 19a will immediately be controlled to prevent passage of current through the controllable rectifier devices 18a and 19a, which means that the power provided by the first AC power source 3 to the power conversion unit 33 will more or less instantaneously be reduced to zero.

At the time $t_2$, it is determined that the first AC power source 3 is again 'OK', and it will be soft started again as described above.

At the time $t_3$, it is determined that the second AC power source 4 is 'NOT OK'. As a result of this determination, controllable rectifier devices 18c and 19c will immediately be controlled to prevent passage of current through the controllable rectifier devices 18c and 19c, which means that the power provided by the second AC power source 4 to the power conversion unit 33 will more or less instantaneously be reduced to zero.

At the time $t_4$, it is determined that the second AC power source 4 is again 'OK', and it will be soft started again as described above.

At the time $t_5$, both the first AC power source 3 and the second AC power source 4 are determined to be 'NOT OK'. As a result of this determination, both the first AC power source 3 and the second AC power source 4 will be shut off as described above, and the power through the power conversion unit 33 will drop to zero.

At the time $t_6$, the second AC power source 4 is again determined to be 'OK' and is soft started again. The power conversion unit 33 is restarted when the power is sufficiently high.

Finally, at the time $t_7$, a logical request to stop power conversion is received, and the second AC power source 4 is turned off.

The invention claimed is:

1. A power supply apparatus for providing electrical power to a power consuming device or a power conversion device from at least one of a first AC power source and a second AC power source, said power supply apparatus comprising:
    first and second input terminals for connection of said first AC power source between said first and second input terminals;
    third and fourth input terminals for connection of said second AC power source between said third and fourth input terminals;
    first and second output terminals for connection of said power consuming device or said power conversion device between said first and second output terminals;
    a plurality of rectifier devices arranged to receive AC power from said first AC power source or said second AC power source, said plurality of rectifier devices comprising:
    at least one rectifier device electrically connecting each of said input terminals and said first output terminal in such a way that current is prevented from flowing from said first output terminal to each of said input terminals; and
    at least one rectifier device electrically connecting each of said input terminals and said second output terminal in such a way that current is prevented from flowing from said input terminals to said second output terminal, wherein each of:
a first rectifier device, of said plurality of rectifier devices, electrically connecting said first input terminal and said first output terminal;
a second rectifier device, of said plurality of rectifier devices, electrically connecting said first input terminal and said second output terminal;
a third rectifier device, of said plurality of rectifier devices, electrically connecting said fourth input terminal and said first output terminal;
a fourth rectifier device, of said plurality of rectifier devices, electrically connecting said fourth input terminal and said second output terminal,
is a controllable rectifier device being controllable to allow or prevent flow of current through said controllable rectifier device,
wherein said power supply apparatus further comprises:
a controller connected to each of said controllable rectifier devices for controlling flow of current through said controllable rectifier devices,
wherein said controller further comprises:
first sensing circuitry arranged to sense at least one of a first voltage, a first frequency, and a first current provided by said first AC power source; and
second sensing circuitry arranged to sense at least one of a second voltage, a second frequency, and a second current provided by said second AC power source, and
wherein said controller is configured to:
control said first rectifier device and said second rectifier device to decrease a time during which flow of current through each of said first rectifier device and said second rectifier device is allowed in response to reduction of at least one of said first voltage and said first frequency; and/or
control said third rectifier device and said fourth rectifier device to decrease a time during which flow of current through each of said third rectifier device and said fourth rectifier device is allowed in response to reduction of at least one of said second voltage and said second frequency.

2. The power supply apparatus according to claim 1, wherein said controller is configured to:
control said first rectifier device and said second rectifier device to allow flow of current through at least one of said first rectifier device and said second rectifier device only during a portion of each half period for said first AC power source; and/or
control said third rectifier device and said fourth rectifier device to allow flow of current through at least one of said third rectifier device and said fourth rectifier device only during a portion of each half period for said second AC power source.

3. The power supply apparatus according to claim 2, wherein said controller is configured to:
control said first rectifier device to allow flow of current through said first rectifier device only during a portion of each positive half period for said first AC power source, and said second rectifier device to allow flow of current through said second rectifier device only during a portion of each negative half period for said first AC power source; and/or
control said third rectifier device to allow flow of current through said third rectifier device only during a portion of each positive half period for said second AC power source, and said fourth rectifier device to allow flow of current through said fourth rectifier device only during a portion of each negative half period for said second AC power source.

4. The power supply apparatus according to claim 2, wherein said controller is configured to:
control said first rectifier device and said second rectifier device to gradually increase a time during which flow of current through each of said first rectifier device and said second rectifier device is allowed; and/or
control said third rectifier device and said fourth rectifier device to gradually increase a time during which flow of current through each of said third rectifier device and said fourth rectifier device is allowed.

5. The power supply apparatus according to claim 1, wherein said controller is configured to:
control said first rectifier device and said second rectifier device based on said first voltage; and
control said third rectifier device and said fourth rectifier device based on said second voltage.

6. The power supply apparatus according to claim 1, wherein said controller is configured to:
determine a measure indicative of a period for said first AC power source based on said first voltage; and
determine a measure indicative of a period for said second AC power source based on said second voltage.

7. The power supply apparatus according to claim 1, wherein said controller is configured to:
compare said first current with a first reference current; and
control, if said first current is larger than said first reference current, said first rectifier device and said second rectifier device to decrease a time during which flow of current through each of said first rectifier device and said second rectifier device is allowed; and/or
compare said second current with a second reference current; and
control, if said second current is larger than said second reference current, said third rectifier device and said fourth rectifier device to decrease a time during which flow of current through each of said third rectifier device and said fourth rectifier device is allowed.

8. The power supply apparatus according to claim 1, wherein said power supply apparatus further comprises the power conversion device connected between said first and second output terminals, said power conversion device being configured to shape an output current between said first and second output terminals to follow an output voltage between said first and second output terminals.

9. A power supply system comprising:
the power supply apparatus according to claim 1;
the first AC power source connected between said first and second input terminals of said power supply apparatus; and
the second AC power source connected between said third and fourth input terminals of said power supply apparatus.

10. The power supply system according to claim 9, wherein:
said first AC power source is a single phase source with neutral connected to said second input terminal; and
said second AC power source is a single phase source with neutral connected to said third input terminal,
said second and third input terminals being electrically connected to each other.

11. A method of switching supply of DC power to a power consuming device from a first AC power source to a second AC power source using a power supply apparatus comprising:

first and second input terminals, said first AC power source being connected between said first and second input terminals;

third and fourth input terminals, said second AC power source being connected between said third and fourth input terminals;

first and second output terminals, said power consuming device being connected between said first and second output terminals;

a plurality of rectifier devices comprising:

at least one rectifier device electrically connecting each of said input terminals and said first output terminal in such a way that current is prevented from flowing from said first output terminal to each of said input terminals; and at least one rectifier device electrically connecting each of said input terminals and said second output terminal in such a way that current is prevented from flowing from said input terminals to said second output terminal, wherein each of:

a first rectifier device, of said plurality of rectifier devices, electrically connecting said first input terminal and said first output terminal;

a second rectifier device, of said plurality of rectifier devices, electrically connecting said first input terminal and said second output terminal;

a third rectifier device, of said plurality of rectifier devices, electrically connecting said fourth input terminal and said first output terminal;

a fourth rectifier device, of said plurality of rectifier devices, electrically connecting said fourth input terminal and said second output terminal, is a controllable rectifier device being controllable to allow or prevent flow of current through said controllable rectifier device, the method comprising the steps of:

sensing at least one of a first voltage, a first frequency, and a first current provided by said first AC power source;

sensing at least one of a second voltage, a second frequency, and a second current provided by said second AC power source; and controlling said first rectifier device and said second rectifier device to decrease a time during which flow of current through each of said first rectifier device and said second rectifier device is allowed in response to reduction of at least one of said first voltage and said first frequency and/or controlling said third rectifier device and said fourth rectifier device to decrease a time during which flow of current through each of said third rectifier device and said fourth rectifier device is allowed in response to reduction of at least one of said second voltage and said second frequency.

12. The method according to claim 11, wherein:

said time during which power from said second AC power source is rectified is gradually increased.

* * * * *